US012728396B2

(12) United States Patent
Hayashi et al.

(10) Patent No.: US 12,728,396 B2
(45) Date of Patent: Sep. 8, 2026

(54) METHOD FOR MANUFACTURING SLURRY FOR INSULATION PROTECTIVE LAYER OF RECHARGEABLE BATTERY AND DEVICE FOR MANUFACTURING SLURRY FOR INSULATION PROTECTIVE LAYER OF RECHARGEABLE BATTERY

(71) Applicants: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Hideki Hayashi, Kurokawa-gun (JP); Masakazu Umehara, Toyota (JP); Naoto Ooshiro, Hamamatsu (JP); Hiroki Yamada, Sendai (JP); Yuuki Kudou, Sendai (JP); Naoya Kishimoto, Nagoya (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 735 days.

(21) Appl. No.: 18/108,565

(22) Filed: Feb. 10, 2023

(65) Prior Publication Data

US 2023/0256404 A1 Aug. 17, 2023

(30) Foreign Application Priority Data

Feb. 14, 2022 (JP) ................................ 2022-020551

(51) Int. Cl.

| | |
|---|---|
| ***B01F 35/221*** | (2022.01) |
| ***B01F 23/50*** | (2022.01) |
| ***B01F 23/60*** | (2022.01) |
| ***B01F 35/21*** | (2022.01) |
| ***B01F 35/71*** | (2022.01) |
| ***C09D 7/61*** | (2018.01) |
| ***C09D 127/16*** | (2006.01) |
| ***H01M 4/62*** | (2006.01) |
| *C08K 3/22* | (2006.01) |

(52) U.S. Cl.

CPC .......... *B01F 35/2218* (2022.01); *B01F 23/51* (2022.01); *B01F 23/69* (2022.01); *B01F 35/2134* (2022.01); *B01F 35/71731* (2022.01); *C09D 7/61* (2018.01); *C09D 127/16* (2013.01); *H01M 4/628* (2013.01); *B01F 2215/0422* (2013.01); *B01F 2215/0431* (2013.01); *C08K 2003/2227* (2013.01)

(58) Field of Classification Search

CPC ...... B01F 35/2218; B01F 23/51; B01F 23/69; B01F 35/2134; B01F 35/71731; B01F 2215/0422; B01F 2215/0431; B01F 23/53; B01F 35/22; C09D 7/61; C09D 127/16; C09D 127/18; H01M 4/628; H01M 4/0404; H01M 4/13; H01M 4/139; H01M 10/0525; H01M 50/443; H01M 50/48; H01M 4/62; H01M 4/621; H01M 4/622; H01M 4/623; H01M 4/624; H01M 4/625; H01M 4/626; H01M 4/627; H01M 50/483; H01M 50/486; C08K 2003/2227; C08K 2201/005; Y02E 60/10

See application file for complete search history.

(56) References Cited

U.S. PATENT DOCUMENTS 5,648,610 A * 7/1997 Laine .................... G01N 29/14 73/587
2011/0003926 A1 1/2011 Nogi et al.
2019/0372150 A1* 12/2019 Busacca ........... H01M 10/0468

FOREIGN PATENT DOCUMENTS

CN 101970316 A 2/2011
JP 2015-176856 A 10/2015
JP 2018-198218 A 12/2018

OTHER PUBLICATIONS

CN Office Action dated Mar. 18, 2024 as received in Application No. 202310097740.0.

* cited by examiner

*Primary Examiner* — Robert S Jones, Jr.
*Assistant Examiner* — Joshua Caleb Bledsoe
(74) *Attorney, Agent, or Firm* — Maschoff Brennan

(57) ABSTRACT

A method for manufacturing slurry for an insulation protective layer of a rechargeable battery includes obtaining an insulation material calibration curve showing a relationship between particle size and compressibility of an insulation material using sets of particle size and compressibility of the insulation material, obtaining a binder calibration curve showing a relationship between particle size and compressibility of a binder using sets of particle size and compressibility of the binder, measuring particle sizes of the insulation material and the binder loaded, determining an optimal mixture weight ratio with reference to the curves so that compressibility of mixture powder of the insulation material and the binder equals a set compressibility based on the measured particle sizes, mixing the insulation material and the binder at the determined mixture weight ratio to form mixture powder, loading the mixture powder into a powder dispenser, and adding a solvent to the mixture powder.

7 Claims, 8 Drawing Sheets

| PVDF [%] | 0 | 10 | 20 | 30 | 40 | 50 | 60 | 70 | 80 | 90 | 100 |
|---|---|---|---|---|---|---|---|---|---|---|---|
| Boehmite [%] | 100 | 90 | 80 | 70 | 60 | 50 | 40 | 30 | 20 | 10 | 0 |
| Necessary Amount for Coating | 0 | 2.54 | 5.08 | 7.61 | 10.15 | 12.68 | 15.22 | 17.75 | 20.29 | 22.82 | 25.36 |

| PVDF [w%] | 0 | 10 | 15 | 20 | 30 | 40 | 50 | 60 | 70 | 80 | 90 | 100 |
|---|---|---|---|---|---|---|---|---|---|---|---|---|
| Compressibility [%] | 53.1 | 48.8 | 46.6 | 44.4 | 40.1 | 35.7 | 31.4 | 27.1 | 22.7 | 18.4 | 14.0 | 9.7 |

METHOD FOR MANUFACTURING SLURRY FOR INSULATION PROTECTIVE LAYER OF RECHARGEABLE BATTERY AND DEVICE FOR MANUFACTURING SLURRY FOR INSULATION PROTECTIVE LAYER OF RECHARGEABLE BATTERY

BACKGROUND

1. Field

The following description relates to a method for manufacturing slurry for an insulation protective layer of a rechargeable battery and a device for manufacturing slurry for an insulation protective layer of a rechargeable battery; more specifically, a method for manufacturing slurry for an insulation protective layer of a rechargeable battery and a device for manufacturing slurry for an insulation protective layer of a rechargeable battery that limit variations in the composition of the slurry.

2. Description of Related Art

A rechargeable battery such as a lithium-ion rechargeable battery is lightweight and has a high energy density and thus is preferably used as a high-output power supply mounted on a vehicle or the like. In such a rechargeable battery, a power storing element has a structure such that a positive electrode and a negative electrode are insulated by a separator. The power storing element is laminated in a single battery case. The power storing element may include a rolled electrode body in which a lamination is rolled in a cylindrical or elliptical shape. In a typical electrode body, the positive electrode and the negative electrode are designed so that a negative mixture layer has a larger width-wise dimension than a positive mixture layer. Thus, the negative mixture layer faces, via the separator, a positive current collector on which metal is exposed. In this case, the positive electrode and the negative electrode normally do not form a short circuit because of the presence of the separator. However, when metal deposits on the negative electrode or fine metal powder collects on the negative electrode, it may penetrate the separator to form a short circuit between the positive electrode and the negative electrode. To prevent such a short circuit, there is disclosure of a positive current collector that includes an insulation protective layer containing inorganic filler. The insulation protective layer is disposed on a surface of the positive current collector along an end of a positive active material layer.

Such an insulation protective layer of a rechargeable battery is formed by mixing particles of an insulation material and a binder that binds the particles, adding a solvent to the mixture to form slurry, and applying the slurry to a predetermined position of the electrode.

Japanese Laid-Open Patent Publication No. 2018-198218 discloses an example of particles of such an insulation material that is formed of an inorganic ceramic such as boehmite because of its high insulating property. The insulation protective layer is not stabilized by only ceramic. Hence, for example, a resin such as polyvinylidene difluoride (PVDF) is used as a binder for binding the insulation protective layer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

FIG. 13 is a block diagram of a prior art device for manufacturing slurry for an insulation protective layer of a lithium-ion rechargeable battery. The manufacturing device includes a powder dispenser 101 including a hopper **2*i* for an insulation material I such as boehmite and a hopper 2*b* for a binder B such as polyvinylidene difluoride (PVDF) for binding the insulation material I. In a conventional method for manufacturing slurry that uses such a manufacturing device, the insulation material I and the binder B are dispensed from the powder dispenser 101. Then, the powder materials are fed by a conveyor 4, which is, for example, an electromagnetic feeder. A solvent E is added to the powder materials to form slurry in a slurry kneader 5**.

FIG. 14 is a schematic diagram of the hopper **2*i* for boehmite in the prior art device for manufacturing slurry for an insulation protective layer of a lithium-ion rechargeable battery. In the prior art, the particle size of the powder of the insulation material I such as boehmite is relatively small. Hence, the particles in the powder are readily aggregated with each other. As a result, as shown in FIG. 14, aggregation may form a bridge and clog the hopper 2*i* and a pipe 6*i* of the powder dispenser 101** with the powder.

FIG. 15 is a schematic diagram of the hopper **2*b* for PVDF in the prior art device for manufacturing slurry for an insulation protective layer of a lithium-ion rechargeable battery. In the prior art, a resin such as PVDF is used as the binder B and is readily charged with static electricity. As shown in FIG. 3, static electricity causes the resin to readily collect on the hopper 2*b* and a pipe 6*b* of the powder dispenser 101**.

Consequently, the binder B and boehmite may fail to be mixed at a specified mixture ratio, resulting in variations in the composition of the powder material.

In an aspect of the present disclosure, a method is for manufacturing slurry for an insulation protective layer of a rechargeable battery. The method includes obtaining an insulation material calibration curve that shows a relationship between particle size and compressibility of an insulation material using sets of particle size and compressibility of the insulation material, obtaining a binder calibration curve that shows a relationship between particle size and compressibility of a binder using sets of particle size and compressibility of the binder, measuring a particle size of the insulation material that is loaded, measuring a particle size of the binder that is loaded, determining an optimal mixture weight ratio with reference to the insulation material calibration curve and the binder calibration curve so that a compressibility of mixture powder of the insulation material and the binder equals a set compressibility based on the measured particle size of the insulation material and the measured particle size of the binder, mixing powder of the insulation material and powder of the binder at the determined mixture weight ratio to form mixture powder of the insulation material and the binder, loading the formed mixture powder of the insulation material and the binder into a powder dispenser, and adding a solvent to the mixture powder, which is loaded in the powder dispenser.

The method described above may further include loading the mixture powder into a slurry kneader using the powder dispenser. The manufacturing of the slurry may include adding a solvent to the mixture powder, which is loaded using the powder dispenser, using the slurry kneader.

In the method described above, the obtaining an insulation material calibration curve may include measuring a bulk density of powder of the insulation material, calculating a compressibility of the powder of the insulation material based on the measured bulk density of the powder of the insulation material, and calculating the insulation material calibration curve from the particle size and the compressibility of the powder of the insulation material. The obtaining a binder calibration curve may include measuring a bulk density of powder of the binder, calculating a compressibility of the powder of the binder based on the measured bulk density of the powder of the binder, and calculating the binder calibration curve from the particle size and the compressibility of the powder of the binder.

In the method described above, the insulation material may include boehmite.

In the method described above, the binder may include polyvinylidene difluoride.

In the method described above, a mixture weight ratio [w %] of a binder to a sum of an insulation material and the binder may be set to be greater than or equal to 15 w %, when a powder dispenser includes a funnel-shaped metal hopper having a surface roughness Ra of 0.02 μm or less, the hopper includes an inner wall inclined from a horizon at an inclination angle θ of 60° to 70°, and the hopper includes a bottom outlet having an inner diameter Dh of 100 to 200 mm, particles of the insulation material have an average particle size Di (d50) that is greater than or equal to 1.0 μm and less than or equal to 3.0 μm, and particles of the binder have an average particle size Db (d50) that is greater than or equal to 50 μm and less than or equal to 150 μm.

In the method described above, the mixture weight ratio [w %] of the binder to the sum of the insulation material and the binder may be set to be less than or equal to 80 w %.

In the method described above, the mixture weight ratio [w %] of the binder to the sum of the insulation material and the binder may be set to be less than or equal to 25 w %.

In an aspect of the present disclosure, a device is for manufacturing slurry for an insulation protective layer. The device includes a slurry kneader, a powder dispenser that loads a raw material into the slurry kneader, and a controller that controls the powder dispenser and the slurry kneader. The powder dispenser includes a powder mixer loaded with powder of an insulation material and powder of a binder to form a uniform mixture powder, and a hopper that loads the mixture powder, which is formed in the powder mixer, into the slurry kneader.

In the device described above, the hopper may be formed from a metal material and funnel-shaped. The hopper includes an inner wall may have a surface roughness Ra of 0.02 μm or less. The inner wall may be inclined from a horizon at an inclination angle θ of 60° to 70°. The hopper may include a bottom outlet having an inner diameter Dh of 100 to 200 mm.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Overview of Present Embodiment

A method for manufacturing slurry for an insulation protective layer of a rechargeable battery according to the present disclosure will be described below with reference to FIGS. 1 to 12 as a method for manufacturing slurry of an insulation protective layer of a lithium-ion rechargeable battery. In the present embodiment, a lithium-ion rechargeable battery, boehmite, and polyvinylidene difluoride (PVDF) are used as an example of a rechargeable battery, an insulation material I, and a binder B, respectively. However, there is no limit to those described in the embodiment.

Principle of Present Embodiment

Problem to be Solved by Present Embodiment

Figure 13:
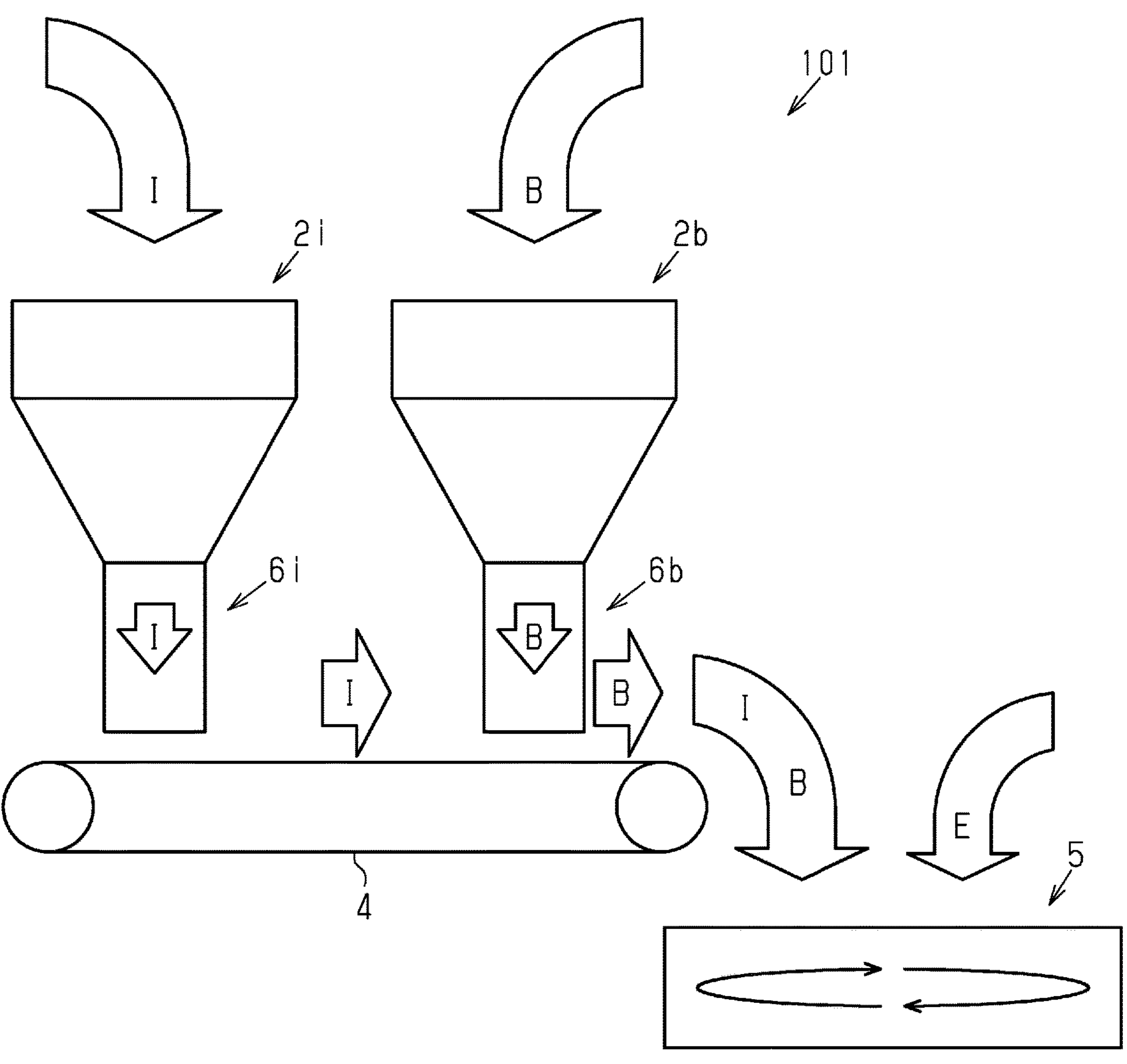
FIG. 13 is a block diagram of a prior art device for manufacturing slurry for an insulation protective layer of a lithium-ion rechargeable battery.
Figure 14:
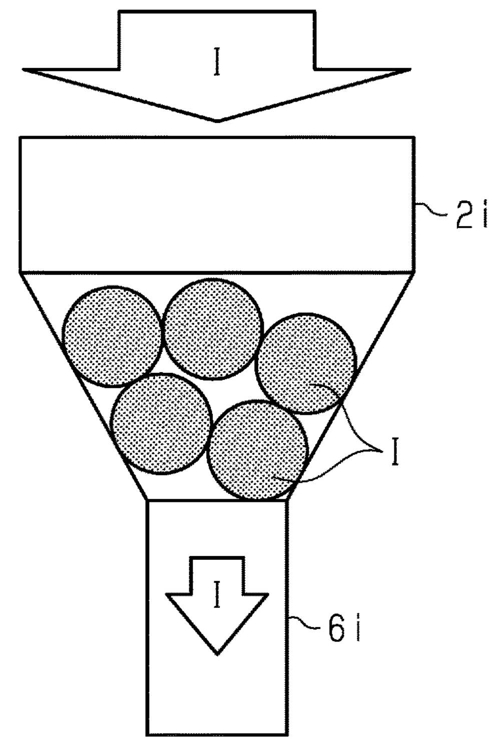
FIG. 14 is a schematic diagram of a hopper for boehmite in the prior art device for manufacturing slurry for an insulation protective layer of a lithium-ion rechargeable battery.

In the prior art, as shown in FIG. 13, the insulation material I is loaded by itself in the hopper 2*i*, and the binder B is loaded by itself in the hopper 2*b*. Boehmite has a relatively small particle size and readily aggregates. Hence, as shown in FIG. 14, the insulation material I (boehmite) aggregates in the hopper 2*i*. This increases the apparent size and results in formation of a bridge. Consequently, clogging or retention occurs in part of the hopper 2*i* and the pipe 6*i*, and the loaded amount of the insulation material I may not completely reach the slurry kneader 5.

Figure 15:
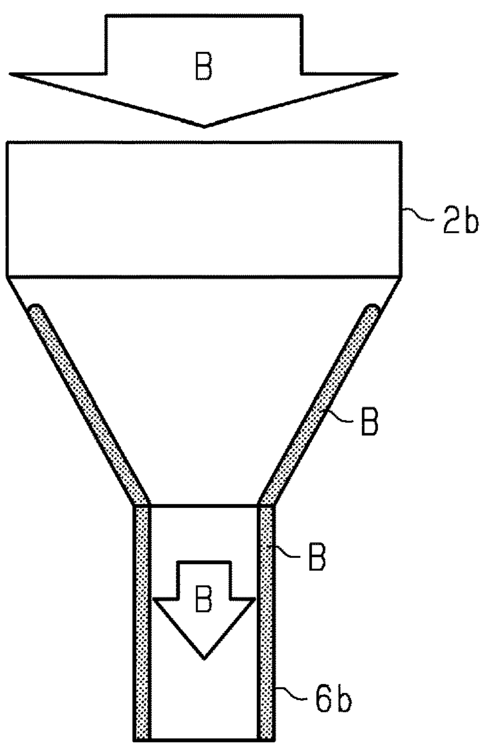
FIG. 15 is a schematic diagram of a hopper for PVDF in the prior art device for manufacturing slurry for an insulation protective layer of a lithium-ion rechargeable battery.

PVDF particles have a property such that the surfaces of PVDF particles are prone to charging. Hence, as shown in FIG. 15, the binder B (PVDF) may directly contact an inner wall of the hopper 2*b* and electrostatically collect on the inner wall of the hopper 2*b*. Consequently, clogging or retention occurs in part of the hopper 2*b* and the pipe 6*b*, and the loaded amount of the binder B may not completely reach the slurry kneader 5.

These phenomena randomly occur and cause the composition of the insulation material I and the binder B to vary each time.

Figure 1:
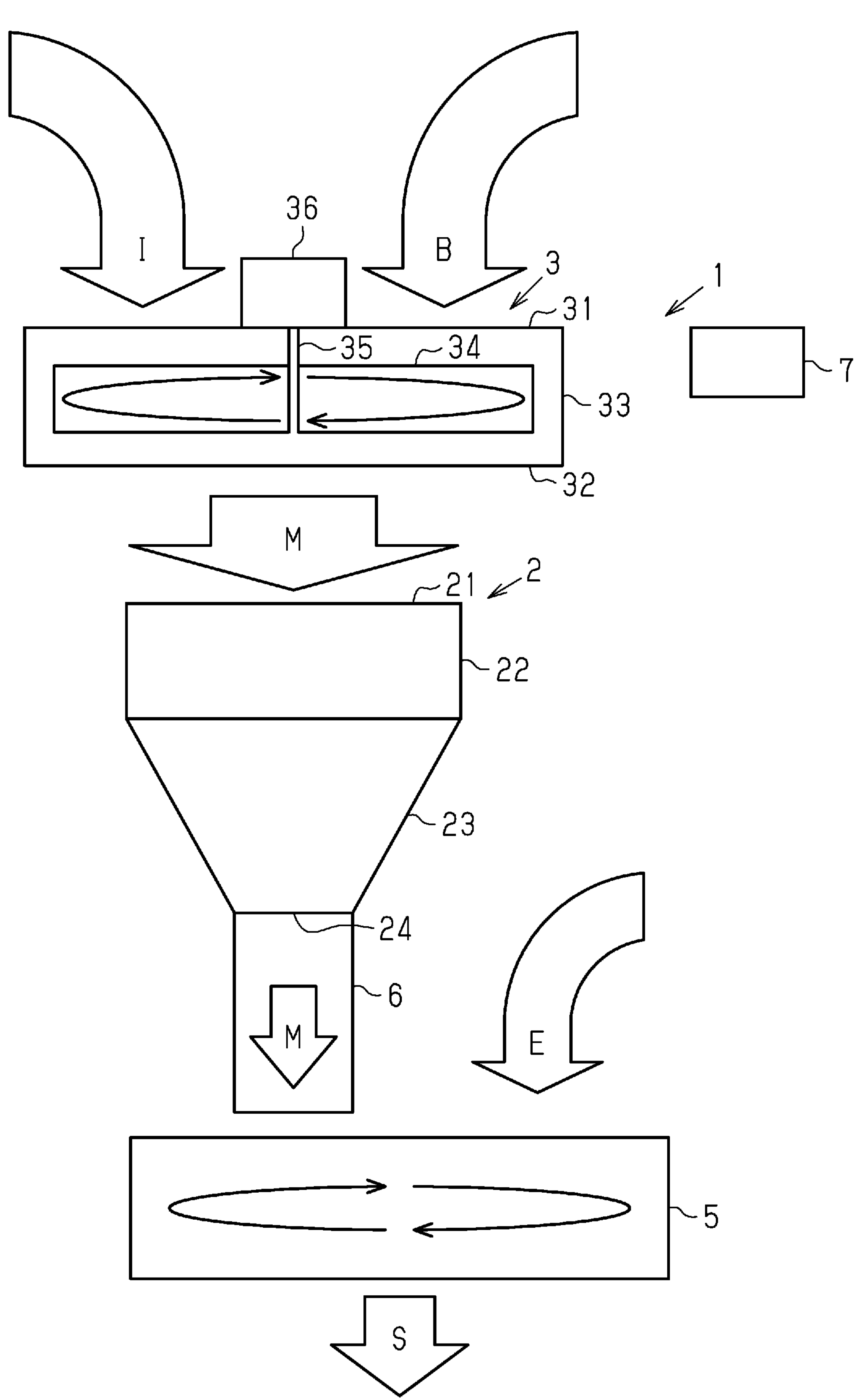
FIG. 1 is a block diagram showing an embodiment of a device for manufacturing slurry for an insulation protective layer of a lithium-ion rechargeable battery.

Overview of Device for Manufacturing Slurry S for Insulation Protective Layer in Present Embodiment FIG. 1 is a block diagram showing the present embodiment of a device for manufacturing slurry S for an insulation protective layer of a lithium-ion rechargeable battery. In the present embodiment, the device for manufacturing the slurry S for the insulation protective layer of the lithium-ion rechargeable battery includes a powder dispenser 1 and a slurry kneader 5. The powder dispenser 1 loads raw materials into the slurry kneader 5. The powder dispenser 1 includes a powder mixer 3 that is loaded with powder of the insulation material I and powder of the binder B to form uniform mixture powder M. The powder dispenser 1 includes a hopper 2 that loads the mixture powder M, which is formed in the powder mixer 3, into the slurry kneader 5. The mixture powder M loaded into the hopper 2 is then loaded into the slurry kneader 5. The mixture powder M loaded into the slurry kneader 5 is kneaded with solvent E such as an organic solvent to manufacture the slurry S for an insulation protective layer. In the present embodiment, the device for manufacturing the slurry S for the insulation protective layer includes a controller 7 including a computer and executes a method for manufacturing the slurry S for the insulation protective layer according to the present embodiment. The device (the controller 7) for manufacturing the slurry S for the insulation protective layer of the present disclosure may be a computer system that includes at least one processor and non-transitory memory (non-transitory computer readable medium) that stores instructions (computer programs) that are executable by the processor to execute control according to any one of the embodiments and modified examples. An example of the control is the flowchart (S1 to S6 and S11 to S14) of the method for manufacturing the slurry S for the insulation protective layer. The processor may include a central processing unit (CPU), a graphics processing unit (GPU), or a dedicated hardware circuit such as an application specific integrated circuit (ASIC) or a combination of these. The non-transitory computer readable medium includes random access memory (RAM), read only memory (ROM), an optical disc storage device such as a CD-ROM, a magnetic disc storage device, a magnetic storage device, or a flash memory. The non-transitory computer readable medium further includes any other medium that can be used for storing desired program codes in the form of instructions or data structures and can be accessed from a computer.

In the present embodiment, a manufacturing device such as that described above is used to mix powder of the insulation material I and powder of the binder B at a predetermined mixture weight ratio [w %] to form the mixture powder M. A feature of the manufacturing device of the present embodiment is the mixture powder M having the predetermined mixture weight ratio [w %] is loaded into the hopper 2.

Operation and Effect of Present Embodiment

Figure 3:
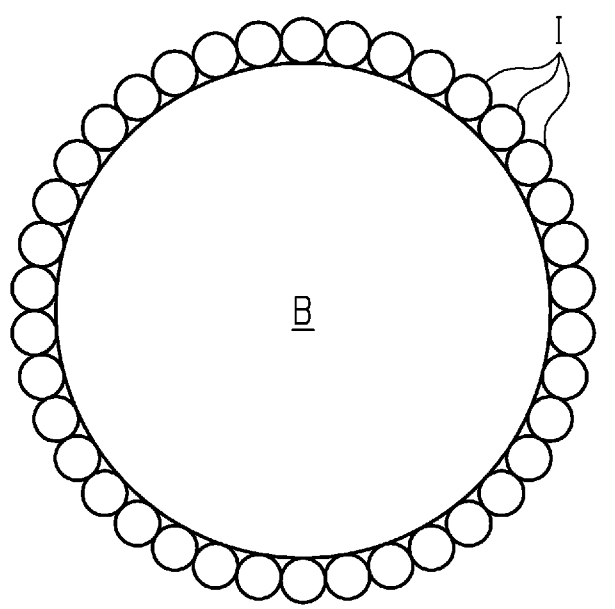
FIG. 3 is a schematic diagram showing the surface of a PVDF particle covered by boehmite particles.

FIG. 3 is a schematic diagram showing the surface of a particle of PVDF, which is the binder B of the present embodiment, covered by particles of boehmite, which is the insulation material I. In the present embodiment, before being loaded into the hopper 2, powder of the insulation material I and powder of the binder B are mixed in advance by the powder mixer 3 to form the mixture powder M. As a result of the mixing, in the mixture powder M, static electricity causes the insulation material I, which has a relatively small particle size, to collect on the binder B, which has a relatively large particle size, to cover the surface of the binder B without excess and deficiency. This hampers electrostatic collection of the surface of the binder B on the inner wall of the hopper 2.

Meanwhile, the collection of the insulation material I, which has a small particle size, on the surface of the binder B results in dispersion of the insulation material I and limits aggregation of the insulation material I.

In the present embodiment, the single common hopper 2 is used as a hopper 2 for the insulation material I and a hopper 2 for the binder B. In addition, electrostatic collection of the mixture powder M is hampered, and a blockage caused by aggregation is limited. Thus, the insulation material I and the binder B are completely and smoothly loaded into the slurry kneader 5. This limits variations in the composition of the slurry S for the insulation protective layer of a lithium-ion rechargeable battery.

The present embodiment of a method for manufacturing slurry for an insulation protective layer of a lithium-ion rechargeable battery will be described below in detail.

Device for Manufacturing Slurry S for Insulation Protective Layer

The device for manufacturing the slurry S for the insulation protective layer includes the powder dispenser 1 and the slurry kneader 5. The powder dispenser 1 includes the powder mixer 3 and the hopper 2. Each component of the device will be described below.

Powder Mixer 3

The powder mixer 3 receives powder of the insulation material I and powder of the binder B to form uniform mixture powder M. The powder mixer 3 is a device that is circular in plan view and includes an upper portion including a large opening 31 for receiving materials, a lower portion that is closed by a bottom surface 32, and a tubular side surface 33. The powder mixer 3 includes a drive shaft 35 vertically disposed in the center to rotate agitating vanes 34 for agitation. The agitating vanes 34 are rotated by a driver 36 to agitate powder in the powder mixer 3. The powder mixer 3 is not limited to that described above and may agitate powder with a screw instead of the agitating vanes 34. Alternatively, the powder mixer 3 may include a tubular drum having a horizontal or diagonal drive shaft, and the container may be configured to rotate.

Although not shown, the powder mixer 3 includes an outlet arranged in the bottom surface 32 and loads the mixture powder M, which has been mixed, into the hopper 2. In addition, the entirety of the powder mixer 3 may be tilted to load the mixture powder M into the hopper 2.

Hopper 2

Figure 2:
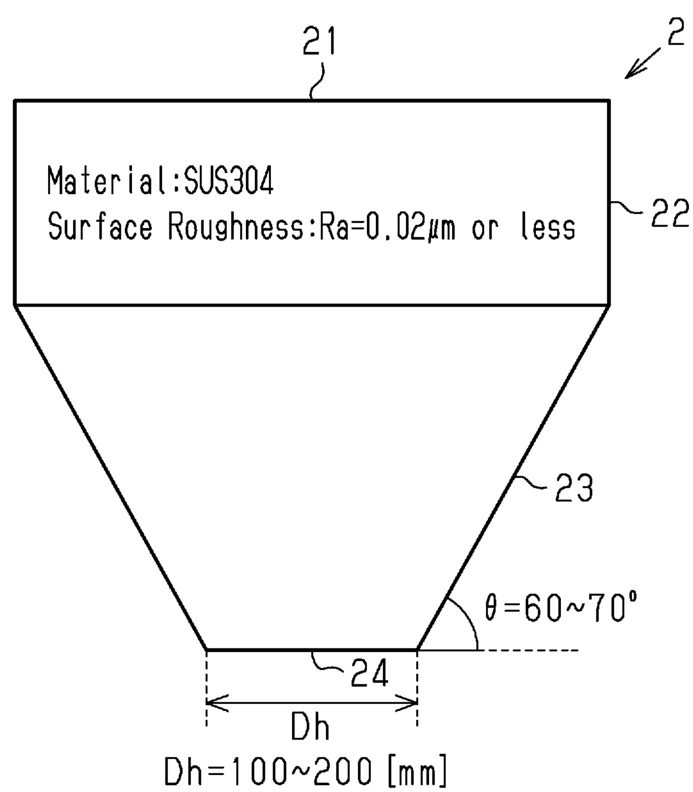
FIG. 2 is a schematic diagram showing a hopper of the device for manufacturing slurry for an insulation protective layer of a lithium-ion rechargeable battery in the embodiment.

FIG. 2 is a schematic diagram showing the hopper 2 of the device for manufacturing slurry for an insulation protective layer of a lithium-ion rechargeable battery in the present embodiment. The hopper 2 loads the mixture powder M, which has been mixed and formed in the powder mixer 3, into the slurry kneader 5. The hopper 2 includes a tubular upper portion 22. The upper portion 22 has an upper end that is open defining an opening 21. The hopper 2 includes a lower portion 23 that is continuous from the upper portion 22 and tapered in the shape of a hollow truncated cone. The lower portion 23 has a lower end that is open defining a circular outlet 24.

In an example, the hopper 2 is formed from stainless steel such as SUS304 and has a surface roughness Ra that is less than or equal to 0.02 μm. The surface roughness Ra being greater than 0.02 μm adversely affects the sliding of the mixture powder M and thus is not preferred. However, a conventional device may be used even when the surface roughness Ra is outside the numerical range.

In the hopper 2, the inner wall of the lower portion 23 has an inclination angle θ of 60° to 70° to the horizon. The outlet 24, which is arranged in the bottom of the hopper 2, includes an inner diameter Dh that is 100 to 200 mm. However, a conventional device may be used even when the inner diameter Dh is outside the numerical range.

Pipe 6

A pipe 6 may be disposed on the outlet 24, which is arranged in the bottom of the hopper 2, and have the same inner diameter as the outlet 24.

Slurry Kneader 5

The slurry kneader 5 receives the mixture powder M from the hopper 2 and kneads the mixture powder M with a solvent E such as an organic solvent to manufacture the slurry S for the insulation protective layer. The type of a kneader is not particularly limited as long as the mixture powder M is uniformly kneaded with the solvent E.

Insulation Material I

It is desirable that the insulation material I have a high insulating property and high thermal resistance, be inexpensive and stable in quality, and have uniform particles.

Examples of the insulation material I include inorganic ceramics, for example, oxides such as silica ($SiO_2$), alumina ($Al_2O_3$), titania ($TiO_2$), lithium titanate ($Li_4Ti_5O_{12}$), zirconia ($ZrO_2$), and barium titanate ($BaTiO_3$) or hydroxides such as boehmite ($Al_2O_3 \cdot 3H_2O$).

In particular, alumina ($Al_2O_3$), lithium titanate ($Li_4Ti_5O_{12}$), barium titanate ($BaTiO_3$), or boehmite ($Al_2O_3 \cdot 3H_2O$) is preferably used as the insulation material I. In the present embodiment, boehmite is used as the insulation material I. However, there is no limit to that described in the embodiment.

In the present embodiment, the average particle size Di (d50) of particles of the insulation material I is, for example, greater than or equal to 1.0 μm and less than or equal to 3.0 μm. Since the average particle size Di (d50) of the insulation material I is relatively small, the insulation material I readily aggregates. The present embodiment limits aggregation of such an insulation material I. Unless otherwise specified in this application, the terms "particle size" and "average particle size" refer to a median diameter (d50) in a frequency distribution measured through a laser diffraction process.

The insulation material I may include only one type of material or a mixture of two or more types of materials.

Binder B

The binder B stabilizes and binds particles of the insulation material I. It is desirable that the binder B have a high insulating property and high thermal resistance, be inexpensive and stable in quality, and have uniform particles.

In the present embodiment, polyvinylidene difluoride (may be abbreviated as "PVDF") is used as the binder B. Resin such as PVDF has a strong bonding force. However, PVDF is prone to charging and collecting on the hopper 2 and the pipe 6 of the powder dispenser 1 due to static electricity. The present embodiment solves the problem caused by the charging of the binder B.

The binder B is not limited to PVDF. Examples of binder B that are similarly prone to charging include carbomethyl cellulose (CMC) and polymethyl methacrylate (PMMA).

Further examples of the binder B include polyethylene (PE), polypropylene (PP), and polytetrafluoroethylene (PTFE). The present embodiment is applicable to these binders B.

In an example, the average particle size Db (d50) of particles of PVDF, which is the binder B of the present embodiment, is greater than or equal to 50 μm and less than or equal to 150 μm. As described above, the average particle size Db (d50) of the binder B is relatively large as compared to the average particle size Di (d50) of particles of the insulation material I, which is greater than or equal to 1.0 μm and less than or equal to 3.0 μm.

Mixture Powder M

Powder of the insulation material I and powder of the binder B are uniformly mixed by the powder mixer 3 to form the mixture powder M.

The mixture powder M may include, for example, a dispersant and a thickener in addition to the insulation material I and the binder B. However, for the sake of simplicity, other components will not be described in the present embodiment, and the mixture powder M is considered to include the insulation material I and the binder B that are mixed at the mixture weight ratio [w %].

Composition of Mixture Powder M

In the present embodiment, the mixture weight ratio [w %] of the insulation material Ito the mixture powder M, that is, the sum of the insulation material I and the binder B, is greater than or equal to 15 w %.

Additionally, the mixture weight ratio [w %] of the insulation material I to the sum of the insulation material I and the binder B is less than or equal to 80 w %. It is desirable that the mixture weight ratio [w %] of the insulation material Ito the sum of the insulation material I and the binder B be less than or equal to 25 w %.

Function of Insulation Protective Layer

It is an objective of the present embodiment to provide a method for manufacturing slurry for an insulation protective layer that is optimal for an insulation protective layer of a lithium-ion rechargeable battery. The insulation protective layer functions to hinder metal deposited on an electrode plate or metal powders and other objects present between electrode plates from penetrating through the separator, thereby limiting formation of a micro-short circuit. Thus, the insulation protective layer needs to have a high insulating property and a high mechanical strength. From this viewpoint, boehmite is a suitable material. The insulation protective layer needs to sufficiently include the insulation material I.

Hence, it is desirable that boehmite, which is the insulation material I of the mixture powder M in the present embodiment, has a high mixture weight ratio [w %].

Stabilization of Insulation Protective Layer

The binder B is added to particles of the insulation material I to form a stable insulation protective layer. From this viewpoint, it is desirable that the mixture weight ratio [w %] of PVDF, which is the binder B of the present embodiment, is greater than or equal to 15 w %. When the mixture weight ratio [w %] of PVDF is less than 15 w %, boehmite, which is the insulation material I, easily separates from the formed insulation protective layer.

However, when the mixture weight ratio [w %] of PVDF is greater than or equal to 25 w %, the mixture weight ratio [w %] of boehmite, which is the insulation material I, is relatively decreased. In addition, excessive viscosity of the slurry hampers uniform application of the slurry.

Amount of Boehmite Necessary to Hamper Electrostatic Collection

Figures 6, 7:
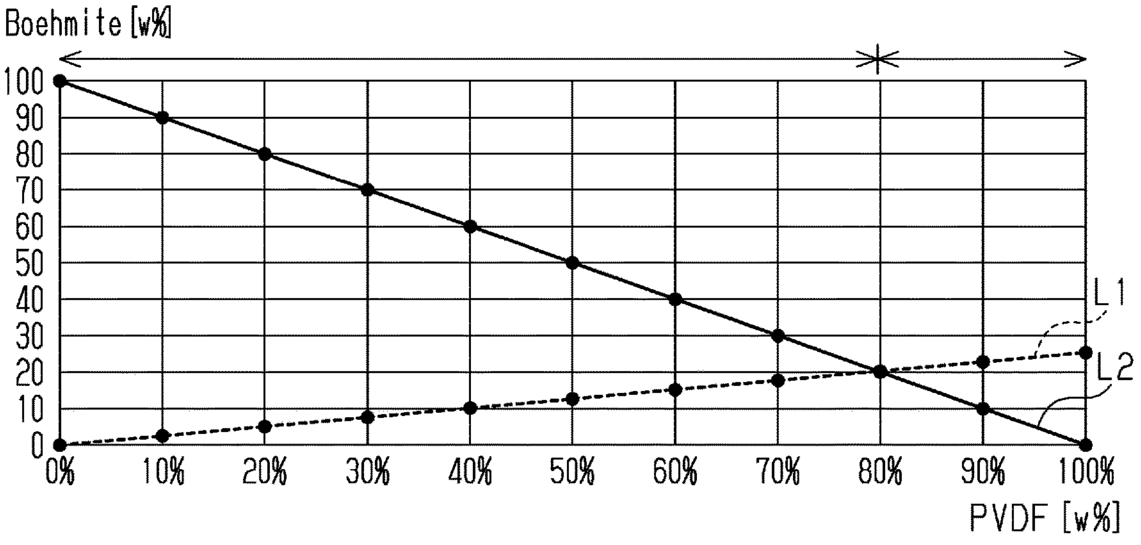
FIG. 6 is a table showing a mixture weight ratio of PVDF to the sum of PVDF and boehmite and an amount of boehmite necessary for a coating to hamper electrostatic collection of PVDF.
FIG. 7 is a graph showing a mixture weight ratio of mixture powder of PVDF and boehmite and an amount of boehmite necessary for a coating to hamper electrostatic collection of PVDF.

FIG. 6 is a table showing the mixture weight ratio [w %] of PVDF to the sum of PVDF and boehmite and an amount of boehmite necessary for coating to hamper electrostatic collection of PVDF.

As shown in FIG. 3, the amount of particles of the insulation material I, which is boehmite in the present embodiment, necessary to coat particles of the binder B, which is PVDF in the present embodiment, is calculated. As shown in FIG. 6, when boehmite is 100% and PVDF is 0%, the amount of boehmite necessary to coat the surface of PVDF is 0 w % of the mixture powder M. When PVDF is 10%, the amount of boehmite for coating the surface of PVDF is 2.54 w % of the mixture powder M. Since boehmite is 90 w % of the mixture powder M, the amount of boehmite is sufficient. When PVDF is 70%, the amount of boehmite for coating the surface of PVDF is 17.75 w % of the mixture powder M. Since boehmite is 30 w % of the mixture powder M, the amount of boehmite is still sufficient. When PVDF is 80%, the amount of boehmite for coating the surface of PVDF is 20.29 w % of the mixture powder M. In this case, the amount of boehmite is 20 w % of the mixture powder M and is approximately sufficient for effectively hampering electrostatic collection. When PVDF is 90%, the amount of boehmite for coating the surface of PVDF is 22.82 w % of the mixture powder M. Since boehmite is 10 w % of the mixture powder M, the amount of boehmite is not sufficient for coating the surface of PVDF.

Thus, the table in FIG. 6 shows that it is preferred that the mixture weight ratio [w %] of the binder B to the sum of the insulation material I and the binder B be less than or equal to 80 w %. In other words, it is preferred that boehmite is greater than or equal to 20 w % of the mixture powder M.

FIG. 7 is a graph showing the mixture weight ratio of mixture powder of PVDF and boehmite and the amount of boehmite necessary for coating to hamper electrostatic collection of PVDF. Line L2 shows the mixture weight ratio [w %]. Line L2 shows the amount of boehmite necessary to coat PVDF. FIG. 7 is a graph showing the relationship shown in FIG. 6. This also shows that the amount of boehmite that coats PVDF to hamper electrostatic collection of PVDF is greater than or equal to 20 w % of the mixture powder M.

In the present embodiment, it is preferred from the viewpoint for hampering electrostatic collection that boehmite is greater than or equal to 20 w % of the mixture powder M.

Compressibility C

Figure 10:
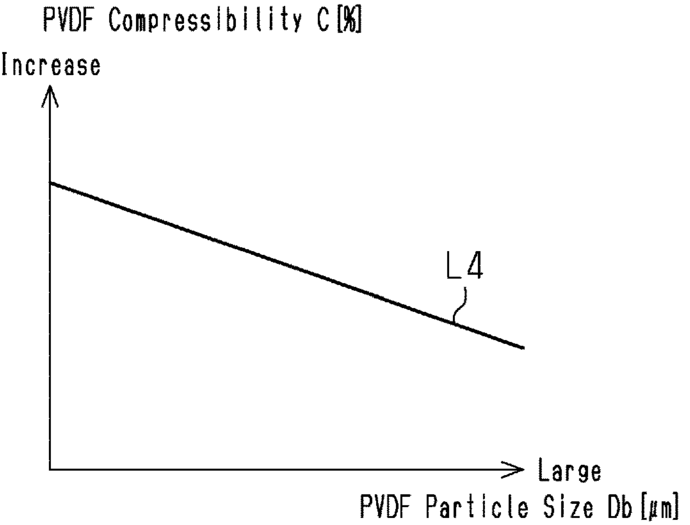
FIG. 10 is a graph showing the relationship between the particle size of PVDF and the compressibility of PVDF.
Figure 11:
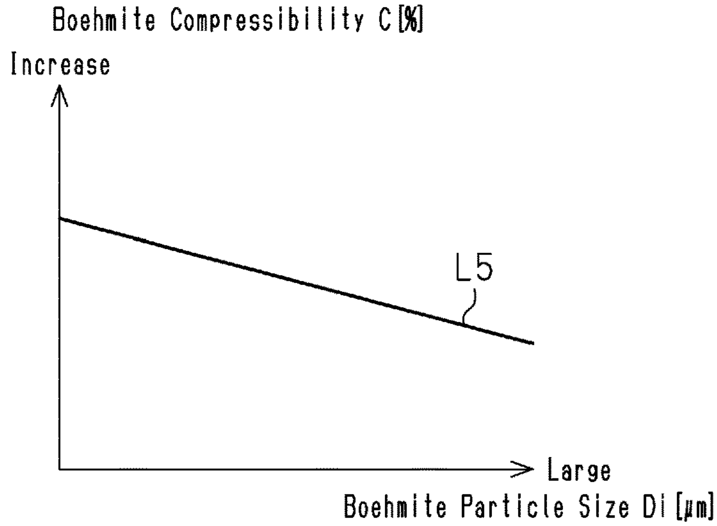
FIG. 11 is a graph showing the relationship between the particle size of boehmite and the compressibility of boehmite.

FIG. 10 is a graph showing the relationship between the particle size Db [μm] of PVDF and the compressibility C [%] of PVDF. FIG. 11 is a graph showing the relationship between the particle size Di [μm] of boehmite and the compressibility C [%] of boehmite.

The compressibility C [%] is defined as the compressibility C [%]=((ρtapped−ρbulk)/ρtapped)×100, where "ρtapped" represents packed bulk density, and "ρbulk" represents aerated bulk density. The compressibility C [%] is considered so that powder having a smaller particle size has a smaller packed bulk density ρtapped (the density in compacted state). That is, as the particle size becomes smaller, the compressibility C [%] is increased. Increases in the compressibility C [%] lower flowability.

Mixture Weight Ratio [%] and Compressibility C [%]

Figure 12:
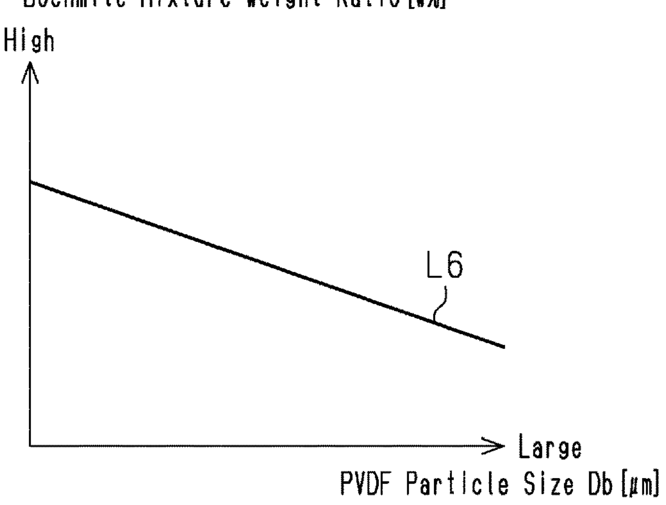
FIG. 12 is a graph showing the relationship between the particle size of PVDF and the amount of boehmite.

FIG. 12 is a graph showing the relationship between the particle size Db [μm] of PVDF and the amount of boehmite. As described above, the particle size Di [μm] of boehmite is smaller than the particle size Db [μm] of PVDF. As the particle size Db [μm] becomes smaller, the compressibility C [%] is increased. Thus, as the amount of boehmite having a relatively small particle size Di [μm] is increased, the compressibility C [%] is increased. In FIG. 12, the particle size Di [μm] of boehmite is assumed to be fixed, and the mixture weight ratio [%] of boehmite for maintaining a constant compressibility C [%] of the mixture powder M is determined. FIG. 12 shows that when the particle size Db [μm] of PVDF is relatively small, the mixture weight ratio [%] of boehmite is relatively high, and that when the particle size Db [μm] of PVDF is relatively large, the mixture weight ratio [%] of boehmite is relatively low. In other words, even when the particle size Db [μm] of PVDF changes, the set compressibility C [%] is obtained by changing the mixture weight ratio [%] of boehmite.

Adjustment of Compressibility C [%] of Mixture Powder M in Present Embodiment

Figures 8, 9:
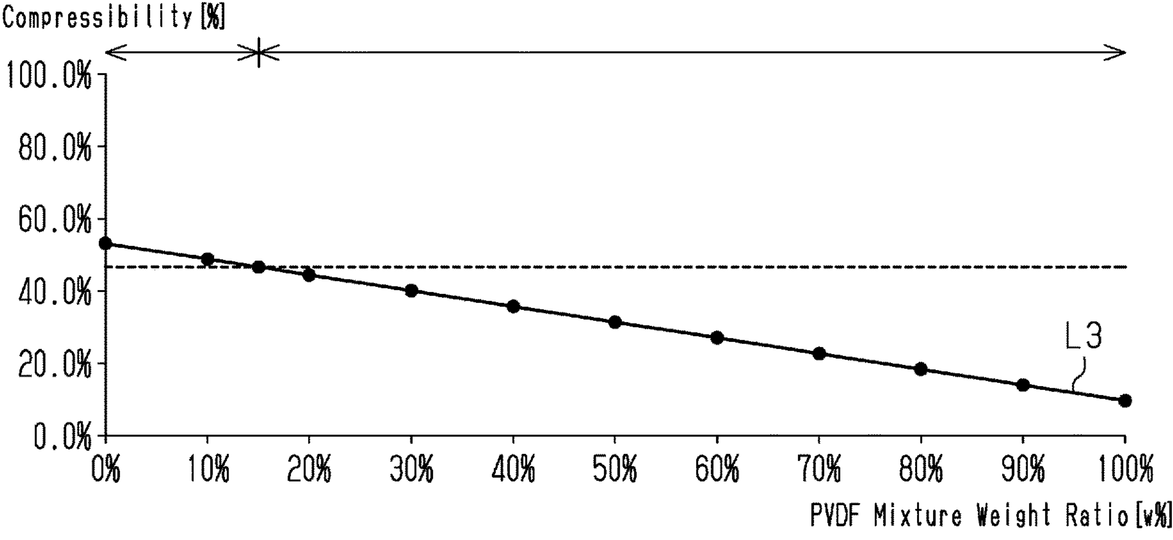
FIG. 8 is a table showing the relationship between the compressibility and the mixture weight ratio of PVDF to the sum of PVDF and boehmite.
FIG. 9 is a graph showing the relationship between the compressibility and the mixture weight ratio of PVDF to the sum of PVDF and boehmite.

FIG. 8 is a table showing the relationship between the compressibility C [%] of the mixture powder M and the mixture weight ratio [w %] of PVDF to the mixture powder M, which is the sum of PVDF and boehmite in the present embodiment. FIG. 9 is a graph showing the relationship between the compressibility C [%] of the mixture powder M and the mixture weight ratio [w %] of PVDF to the sum of PVDF and boehmite.

When PVDF is 0%, that is, PVDF is not added to boehmite, the compressibility C [%] of the mixture powder M conforms to the compressibility C [%] of boehmite itself. In the present embodiment, the compressibility C [%] of the mixture powder M is 53.1%. In this state, the compressibility C [%] of boehmite is so high that aggregation occurs and flowability lowers. As a result, as in the description of the prior art, a bridge is formed due to aggregation on the hopper 2 and the pipe 6 and hampers a smooth complete loading of the mixture powder M into the slurry kneader 5.

As a reference, when PVDF is 100%, that is, when the mixture powder M is entirely PVDF and the mixture powder M contains no boehmite, the compressibility C [%] of the mixture powder M conforms to the compressibility C [%] of PVDF itself. In the present embodiment, the compressibility C [%] of the mixture powder M is 9.7%. In this state, the compressibility C [%] of the mixture powder M is low, and aggregation is less likely to occur. Therefore, the flowability is not adversely affected. However, because the mixture powder M does not contain boehmite, or the insulation material I, the insulation protective layer cannot be formed.

In the present embodiment, the present inventors have determined from study that the compressibility C [%] of the mixture powder M that does not form a bridge caused by aggregation on the hopper 2 or the pipe 6 is approximately 47%.

When PVDF is 10 w %, the compressibility C [%] of the mixture powder M is 48.8%. The compressibility C [%] of the mixture powder M is improved but is still so high that aggregation occurs and flowability is lowered.

When PVDF is 15 w %, the compressibility C [%] of the mixture powder M is 46.6%, which is less than 47%, or the target compressibility C [%]. In this state, the compressibility C [%] of the mixture powder M is low enough to limit formation of a bridge caused by aggregation, thereby effectively limiting the lowering of the flowability.

Therefore, as shown in FIG. 9, it is preferred from the viewpoint of the compressibility C [%] of the mixture powder M that PVDF be greater than or equal to 15 w % of the mixture powder M and boehmite be less than 85 w %.

Method for Manufacturing Slurry for Insulation Protective Layer

Figure 4:
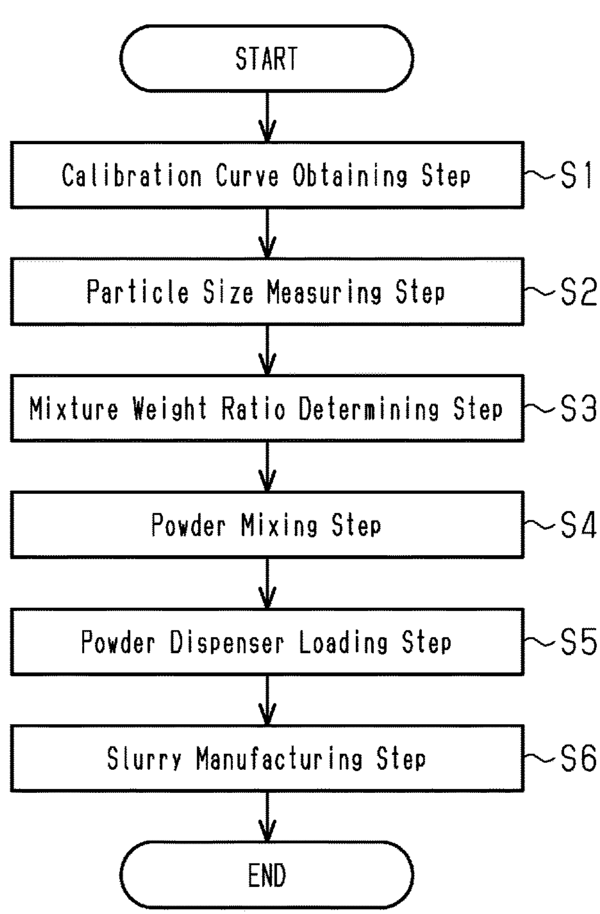
FIG. 4 is a flowchart of an embodiment of a method for manufacturing slurry for an insulation protective layer of a lithium-ion rechargeable battery.

FIG. 4 is a flowchart of a method for manufacturing slurry for an insulation protective layer of a lithium-ion rechargeable battery in the present embodiment. The method for manufacturing slurry for an insulation protective layer of a lithium-ion rechargeable battery in the present embodiment will be described with reference to FIG. 4.

The method for manufacturing slurry for an insulation protective layer includes a calibration curve obtaining step (S1), a particle size measuring step (S2), a mixture weight ratio determining step (S3), a powder mixing step (S4), a powder dispenser loading step (S5), and a slurry manufacturing step (S6).

Calibration Curve Obtaining Step (S1)

The calibration curve obtaining step (S1) includes an insulation material calibration curve obtaining step that obtains an insulation material calibration curve showing a relationship between the compressibility C [%] and the particle size [μm] of the insulation material I from a relationship between the compressibility C [%] and the particle size [μm] of the insulation material I having different particle sizes [μm]. The calibration curve obtaining step (S1) further includes a binder calibration curve obtaining step that obtains a binder calibration curve showing a relationship between the compressibility C [%] and the particle size [μm] of the binder B from a relationship between the compressibility C [%] and the particle size [μm] of the binder B having different particle sizes [μm].

The calibration curve refers to a graph showing the relationship of different particle sizes [μm] that are calculated from data measured in advance in tests with a compressibility C [%] corresponding to each particle size [μm]. In an example, the calibration curve is obtained from sets of particle size [μm] and compressibility C [%] of powder (of the insulation material I or the binder B) that are measured in tests in advance. Thus, the compressibility C [%] of powder is estimated by measuring the particle size [μm] of the powder and referring to the calibration curve for the measured particle size [μm].

Detail of Calibration Curve Obtaining Step (S1)

Figure 5:
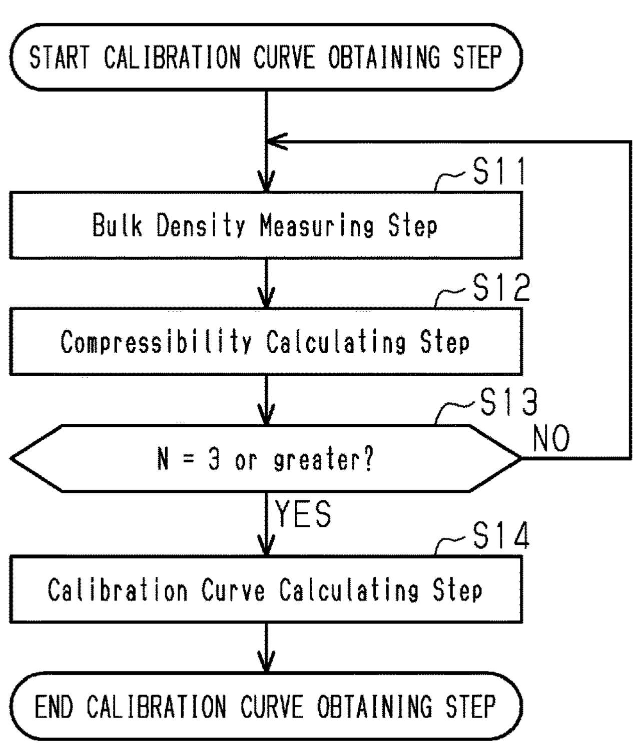
FIG. 5 is a flowchart of a process for obtaining a calibration curve in the method for manufacturing slurry for an insulation protective layer of a lithium-ion rechargeable battery in the embodiment.

FIG. 5 is a flowchart of a process for obtaining a calibration curve in the method for manufacturing slurry for an insulation protective layer of a lithium-ion rechargeable battery in the present embodiment. In the present embodiment, the calibration curve obtaining step (S1) includes the following process.

The calibration curve obtaining step (S1) includes a bulk density measuring step (S11), a compressibility calculating step (S12), and a calibration curve calculating step (S14), which is executed after S11 and S12.

Bulk Density Measuring Step (S11)

The bulk density measuring step (S11) includes an insulation material bulk density measuring step that measures the bulk density of powder of the insulation material I and a binder bulk density measuring step that measures the bulk density of powder of the binder B. The procedure differs between the two steps only in the subject of measurement and will be described together.

The "bulk density ρ" is the density in an apparent volume [g/$cm^3$]. The "bulk density ρ" uses the "aerated bulk density ρ bulk" and the "packed bulk density ρ tapped". The "aerated bulk density ρ bulk" is also referred to as a poured density. The powder is gently poured so that the void ratio or the porosity ratio has a relatively large value. The "packed bulk density ρ tapped" is also referred to as a compaction density. Powder is maximally compacted so that the void ratio or the porosity ratio has a relatively small value. The mass [g] and the volume [$cm^3$] of powder that is subject to measurement are measured. The measured mass [g] is divided by the measured volume [$cm^3$].

In the insulation material bulk density measuring step that measures the bulk density ρ of powder of the insulation material I, the mass [g] of powder of the insulation material I is divided by the volume [$cm^3$] of the powder to measure "insulation material bulk density ρi". In an example, the "insulation material bulk density ρi" includes the packed bulk density and the aerated bulk density of powder of the insulation material I. In the binder bulk density measuring step that measures the bulk density ρ of powder of the binder B, the mass [g] of powder of the binder B is divided by the volume [$cm^3$] of the powder to measure "binder bulk density ρb". In an example, the "binder bulk density ρb" includes the packed bulk density and the aerated bulk density of powder of the binder B.

Compressibility Calculating Step (S12)

The compressibility calculating step (S12) includes an insulation material compressibility calculating step and a binder compressibility calculating step. The procedure differs between the insulation material compressibility calculating step and the binder compressibility calculating step only in the subject of calculation and thus will be described together.

The insulation material compressibility calculating step calculates the compressibility C [%] of powder of the insulation material I based on the bulk density ρi of powder of the insulation material I measured in the bulk density measuring step (S11).

As described above, the compressibility C [%] is calculated as the compressibility C [%]=((ρtapped−ρbulk)/ρtapped)×100, where "ρtapped" represents the packed bulk density and "ρbulk" represents the aerated bulk density.

The binder compressibility calculating step is executed by the same procedure to calculate the compressibility C [%] of powder of the binder B.

Measurement in Different Particle Sizes

The bulk density measuring step (S11) and the compressibility calculating step (S12) are executed by the procedure described above. The objective of the step is to obtain the relationship between the particle size [μm] and the compressibility C [%] of the insulation material I and the relationship between the particle size [μm] and the compressibility C [%] of the binder B. Therefore, combinations of the particle size [μm] and the compressibility C [%] need to be plotted on a graph so that the relationship between the particle size [μm] and the compressibility C [%] is analyzed. Each of the bulk density measuring step (S11) and the compressibility calculating step (S12) needs to measure a different particle size [μm] three times or more.

Hence, in step S13, it is determined whether the measurement has been performed three times or more. When the measurement has been performed less than three times (S13: NO), the process returns to the bulk density measuring step (S11) and performs the measurement with a different particle size [μm]. When the measurement has been performed three times or more (S13: YES), the process proceeds to the calibration curve calculating step (S14).

Calibration Curve Calculating Step (S14)

The calibration curve calculating step (S14) includes an insulation material calibration curve calculating step and a binder calibration curve calculating step. The insulation material calibration curve calculating step calculates a calibration curve from the particle size [μm] and the compressibility C [%] of powder of the insulation material I. The binder calibration curve calculating step calculates a calibration curve from the particle size [μm] and the compressibility C [%] of powder of the binder B.

The procedure differs between the insulation material calibration curve calculating step and the binder calibration curve calculating step only in the subject of calculation and thus will be described together.

In the insulation material calibration curve calculating step, each of the bulk density measuring step (S11) and the compressibility calculating step (S12) measures a different particle size [μm] three times or more. The calibration curve calculating step (S14) obtains a relationship between the particle size [μm] and the compressibility C [%] of the insulation material I and a relationship between the particle size [μm] and the compressibility C [%] of the binder B. Combinations of the particle size [μm] and the compressibility C [%] measured in the bulk density measuring step (S11) and the compressibility calculating step (S12) are plotted on a graph. Based on the points plotted on a graph showing the relationship between the particle size [μm] and the compressibility C [%], a graph is drawn so as to extend through the plotted points. When there are three plotted points, the graph is drawn as a quadratic curve. There may be two plotted points. With the two plotted points, the graph is drawn as a linear function. When a large number of points is plotted, the relationship between the particle size [μm] and the compressibility C [%] is specified by regression analysis using the method of least squares. The relationship is stored in a computer (not shown).

Through the procedure described above, the insulation material calibration curve and the binder calibration curve are obtained. When the particle size Di [μm] (d50) of the insulation material I is measured, the compressibility C [%] of the insulation material I is immediately obtained using the insulation material calibration curve. In the same manner, when the particle size Db [μm] (d50) of the binder B is measured, the compressibility C [%] of the binder B is immediately obtained using the binder calibration curve.

Particle Size Measuring Step (S2)

The particle size measuring step (S2) includes an insulation material measuring step that measures the particle size Di (d50) of the insulation material I that is loaded and a binder measuring step that measures the particle size Db (d50) of the binder B that is loaded. In an example, the insulation material measuring step measures the particle size Di (d50) of the insulation material I before the insulation material I is loaded into the powder dispenser. In an example, the binder measuring step measures the particle size Db (d50) of the binder B before the binder B is loaded into the powder dispenser.

The procedure differs between the insulation material measuring step and the binder measuring step only in the subject of measurement and thus will be described together.

Each of the average particle size Di of particles of the insulation material I and the average particle size Db of the binder B that are loaded is an average median diameter obtained through a laser diffraction process.

Mixture Weight Ratio Determining Step (S3)

In the mixture weight ratio determining step (S3), the average particle size Di of particles of the insulation material I and the average particle size Db of the binder B, which are obtained in the particle size measuring step (S2), are each converted into the compressibility C [%]. Conversion into the compressibility C [%] is performed with reference to the insulation material calibration curve and the binder calibration curve, which are calculated in the calibration curve calculating step (S14).

The mixture weight ratio [w %] between the insulation material I and the binder B is determined from the compressibility C [%] of the insulation material I and the compressibility C [%] of the binder B so that the compressibility C [%] of the mixture powder M equals a set compressibility C [%]. In this step, for example, as shown in FIG. 9, line L3 is formed to show the compressibility C [%] of the mixture powder M when the mixture weight ratio [w %] of the binder B is from 0 w % to 100 w % based on the calculated compressibility C [%] of the insulation material I and the calculated compressibility C [%] of the binder B. The mixture weight ratio [w %] between the insulation material I and the binder B in the mixture powder M is determined so that the compressibility C [%] of the mixture powder M is less than or equal to a compressibility C [%] that hampers formation of a bridge.

Powder Mixing Step (S4)

In the powder mixing step (S4), the insulation material I and the binder B are loaded from the opening 31 into the powder mixer 3, shown in FIG. 1, and mixed at the mixture weight ratio [w %] between the insulation material I and the binder B determined in the mixture weight ratio determining step (S3). In this step, a solvent is not added to the insulation material I and the binder B. The insulation material I and the binder B are mixed in a dry state. In the powder mixer 3, the driver 36 rotates the drive shaft 35 so that the insulation material I and the binder B are uniformly mixed by the agitating vanes 34.

Powder Dispenser Loading Step (S5)

In the powder dispenser loading step (S5), the mixture powder M, which is obtained by uniformly mixing the insulation material I and the binder B in the powder mixing step (S4), is loaded into the hopper 2 of the powder dispenser 1. The loading is performed by opening the outlet (not shown) arranged in the bottom surface 32 of the powder mixer 3 so that the mixture powder M falls due to gravity. The powder mixer 3 may be tilted. Further, the mixture powder M may be pneumatically pumped and loaded into the hopper 2. Even in this case, the mixture powder M is smoothly loaded into the hopper 2 without being aggregated or electrostatically collected.

To achieve a further smooth loading, the powder mixer 3 and the pipe 6 may be vibrated by a vibrator. The mixture powder M may be conveyed by an electromagnetic feeder before the mixture powder M is loaded into the hopper 2.

Slurry Manufacturing Step (S6)

As shown in FIG. 1, the mixture powder M, which is loaded into the hopper 2, is then loaded into the slurry kneader 5 through the pipe 6. In the slurry manufacturing step (S6), the slurry kneader 5 adds the solvent E to the mixture powder M and kneads the solvent E and the mixture powder M to manufacture the slurry S for the insulation protective layer.

Operation of Embodiment

In the present embodiment, before being loaded into the hopper 2, powder of the insulation material I and powder of the binder B are mixed by the powder mixer 3 to form the mixture powder M. As a result of the mixing, in the mixture powder M, particles of the insulation material I, which has a relatively small particle size, collect on the binder B, which has a relatively large particle size, so as to cover the surfaces of particles of the binder B without excess and deficiency. This hampers electrostatic collection of the surfaces of particles of the binder B.

Meanwhile, the collection of the particles of the insulation material I, which has a small particle size, on the surface of a particle of the binder B results in dispersion of the insulation material I and limits aggregation of the insulation material I.

In the present embodiment, the single common hopper 2 is used for the insulation material I and the binder B. Also, electrostatic collection of the mixture powder M is hampered, and a blockage caused by aggregation is limited. Thus, the insulation material I and the binder B are completely and smoothly loaded into the slurry kneader 5. This limits variations in the composition of the slurry S for the insulation protective layer of a lithium-ion rechargeable battery.

Effects of Embodiment (1) According to the present embodiment of the method for manufacturing slurry for an insulation protective layer of a lithium-ion rechargeable battery, variations in the composition of the slurry S for the insulation protective layer are limited.

(2) Powder of the insulation material I is mixed with powder of the binder B so that the insulation material I, which is less likely to be charged, collects on and coats the surface of the binder B, which is prone to charging. This limits collection of the mixture powder M on the hopper 2 and the pipe 6 caused by static electricity.

(3) Powder of the insulation material I is mixed with powder of the binder B so that the insulation material I, which has a small particle size, collects on the surface of the binder B, which is prone to charging. This disperses the insulation material I and limits aggregation of the insulation material I.

(4) The powder of the insulation material I and the powder of the binder B are mixed at an optimal ratio to optimize the mixture powder M. This lowers the compressibility C [%] and ensures the flowability of the powder.

(5) The hopper 2 of the powder dispenser 1 is funnel-shaped, is formed from metal, and has a surface roughness Ra of 0.02 μm or less. The inner wall of the hopper 2 is inclined at an inclination angle θ of 60° to 70° from the horizon. The inner diameter Dh of the bottom outlet of the hopper 2 is 100 to 200 mm.

This allows the mixture powder M to smoothly slide on the hopper 2 without collecting on the hopper 2 and be completely loaded into the slurry kneader 5.

(6) The powder of the insulation material I and the powder of the binder B are mixed to form the mixture powder M. This allows the single common hopper 2 to be used for the insulation material I and the binder B. Thus, there is no need to prepare multiple hoppers and a conveying device between the hoppers.

(7) The mixture weight ratio [w %] of the binder B to the sum of the insulation material I and the binder B is set to be greater than or equal to 15 w %. This effectively limits separation and fall of the insulation material I.

(8) The mixture weight ratio [w %] of the binder B to the sum of the insulation material I and the binder B is set to be greater than or equal to 15 w %. This limits aggregation of the insulation material I, thereby effectively limiting formation of a bridge of the insulation material I on the hopper 2.

(9) The mixture weight ratio [w %] of the binder B to the sum of the insulation material I and the binder B is set to be less than or equal to 80 w %. This effectively hampers electrostatic collection by coating the surface of the binder B with the insulation material I.

(10) The mixture weight ratio [w %] of the binder B to the sum of the insulation material I and the binder B is set to be less than or equal to 25 w %. This enhances the insulating property of the insulation protective layer and also effectively limits entrance of metal or the like.

(11) The calibration curve obtaining step (S1) includes the insulation material calibration curve obtaining step and the binder calibration curve obtaining step. The insulation material calibration curve obtaining step obtains an insulation material calibration curve showing the relationship between the particle size Di and the compressibility C [%] of the insulation material I having powders differing in the particle size Di. The binder calibration curve obtaining step obtains a binder calibration curve showing the relationship between the particle size Db and the compressibility C [%] of the binder B having powders differing in the particle size Db. When the particle size of each of the insulation material I and the binder B is measured, the compressibility C [%] of each of the insulation material I and the binder B is obtained with reference to an insulation material calibration curve L5 and a binder calibration curve L4.

(12) The calibration curve obtaining step (S1) includes the bulk density measuring step (S11) and the compressibility calculating step (S12). These steps are repeatedly executed to obtain the insulation material calibration curve L5 and the binder calibration curve L4.

MODIFIED EXAMPLES

In the present embodiment, a lithium-ion rechargeable battery is used as an example of a rechargeable battery. However, the present invention is not limited to a lithium-ion rechargeable battery and may be applied to other rechargeable batteries having an insulation protective layer as long as the present invention can be implemented.

In the present embodiment, boehmite is used as an example of the insulation material I. However, an insulation material I other than boehmite such as alumina may be used. In the present embodiment, PVDF is used as an example of the binder B. Instead of PVDF, other resins that are prone to charging may be used as the binder B.

The hopper 2 described in the present embodiment is a preferred example. A conventional hopper may be used. In this case, one skilled in the art may optimize the compressibility C [%] in accordance with the hopper.

The numerical values and ranges used in the present embodiment are examples and may be optimized by one skilled in the art.

The flowcharts shown in FIGS. 4 and 5 are examples. One skilled in the art may add, remove, change, reorder the steps when executing the flowcharts.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing slurry for an insulation protective layer of a rechargeable battery, the method comprising:

obtaining an insulation material calibration curve that shows a relationship between particle size and compressibility of an insulation material using sets of particle size and compressibility of the insulation material;

obtaining a binder calibration curve that shows a relationship between particle size and compressibility of a binder using sets of particle size and compressibility of the binder;

measuring a particle size of the insulation material that is loaded;

measuring a particle size of the binder that is loaded;

determining mixture weight ratio with reference to the insulation material calibration curve and the binder calibration curve so that a compressibility of mixture powder of the insulation material and the binder equals a set compressibility based on the measured particle size of the insulation material and the measured particle size of the binder;

mixing powder of the insulation material and powder of the binder at the determined mixture weight ratio to form mixture powder of the insulation material and the binder;

loading the formed mixture powder of the insulation material and the binder into a powder dispenser; and adding a solvent to the mixture powder, which is loaded in the powder dispenser.

2. The method according to claim 1, wherein the obtaining an insulation material calibration curve includes measuring a bulk density of powder of the insulation material, calculating a compressibility of the powder of the insulation material based on the measured bulk density of the powder of the insulation material, and calculating the insulation material calibration curve from the particle size and the compressibility of the powder of the insulation material, and the obtaining a binder calibration curve includes measuring a bulk density of powder of the binder, calculating a compressibility of the powder of the binder based on the measured bulk density of the powder of the binder, and calculating the binder calibration curve from the particle size and the compressibility of the powder of the binder.

3. The method according to claim 1, wherein the insulation material includes boehmite.

4. The method according to claim 1, wherein the binder includes polyvinylidene difluoride.

5. The method according to claim 1, wherein when the powder dispenser includes a funnel-shaped metal hopper having a surface roughness Ra of 0.02 μm or less, the hopper includes an inner wall inclined from a horizon at an inclination angle θ of 60° to 70°, and the hopper includes a bottom outlet having an inner diameter Dh of 100 to 200 mm, particles of the insulation material have an average particle size Di (d50) that is greater than or equal to 1.0 μm and less than or equal to 3.0 μm, and particles of the binder have an average particle size Db (d50) that is greater than or equal to 50 μm and less than or equal to 150 μm, a mixture weight ratio [w %] of the binder to a sum of the insulation material and the binder is greater than or equal to 15 w %.

6. The method according to claim 5, wherein the mixture weight ratio [w %] of the binder to the sum of the insulation material and the binder is set to be less than or equal to 80 w %.

7. The method according to claim 5, wherein the mixture weight ratio [w %] of the binder to the sum of the insulation material and the binder is set to be less than or equal to 25 w %.

* * * * *